United States Patent [19]
Boland

[11] Patent Number: 5,095,327
[45] Date of Patent: Mar. 10, 1992

[54] CAMERA LENS HOOD

[76] Inventor: John J. Boland, 1 Maple La. - Jensen Park, Danbury, Conn. 06810

[21] Appl. No.: 673,315

[22] Filed: Mar. 22, 1991

[51] Int. Cl.⁵ ............................................. G03B 11/04
[52] U.S. Cl. ........................................... 354/287
[58] Field of Search ............................... 354/287

[56] References Cited

U.S. PATENT DOCUMENTS 3,379,485  4/1968  Steisslinger ..................... 354/287
4,909,617  3/1990  Boyd ............................... 354/287

Primary Examiner—Michael L. Gellner
Attorney, Agent, or Firm—Leon Gilden

[57] ABSTRACT

A lens hood is mounted in association with a lens of a camera for positioning the hood and its forward planar surface in contiguous communication with a transparent window pane and the like to permit photographing utilizing a flash through the window pane without glare. The organization includes a foam polymeric cylinder mounted to a rigid mounting ring that in turn is secured to the camera lens in a coaxially aligned relationghip. A modification of the invention includes a plurality of separately removable sections, with each section including a mounting face and a gel filled sealing ring mounted within the forward face for enhanced securement engagement with the window pane.

6 Claims, 4 Drawing Sheets

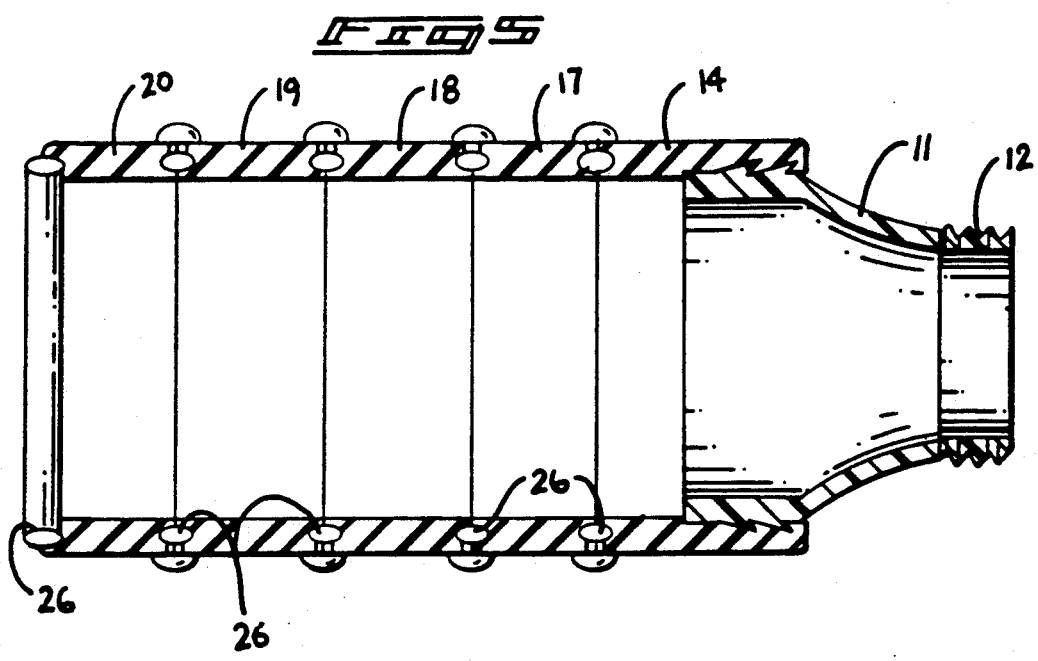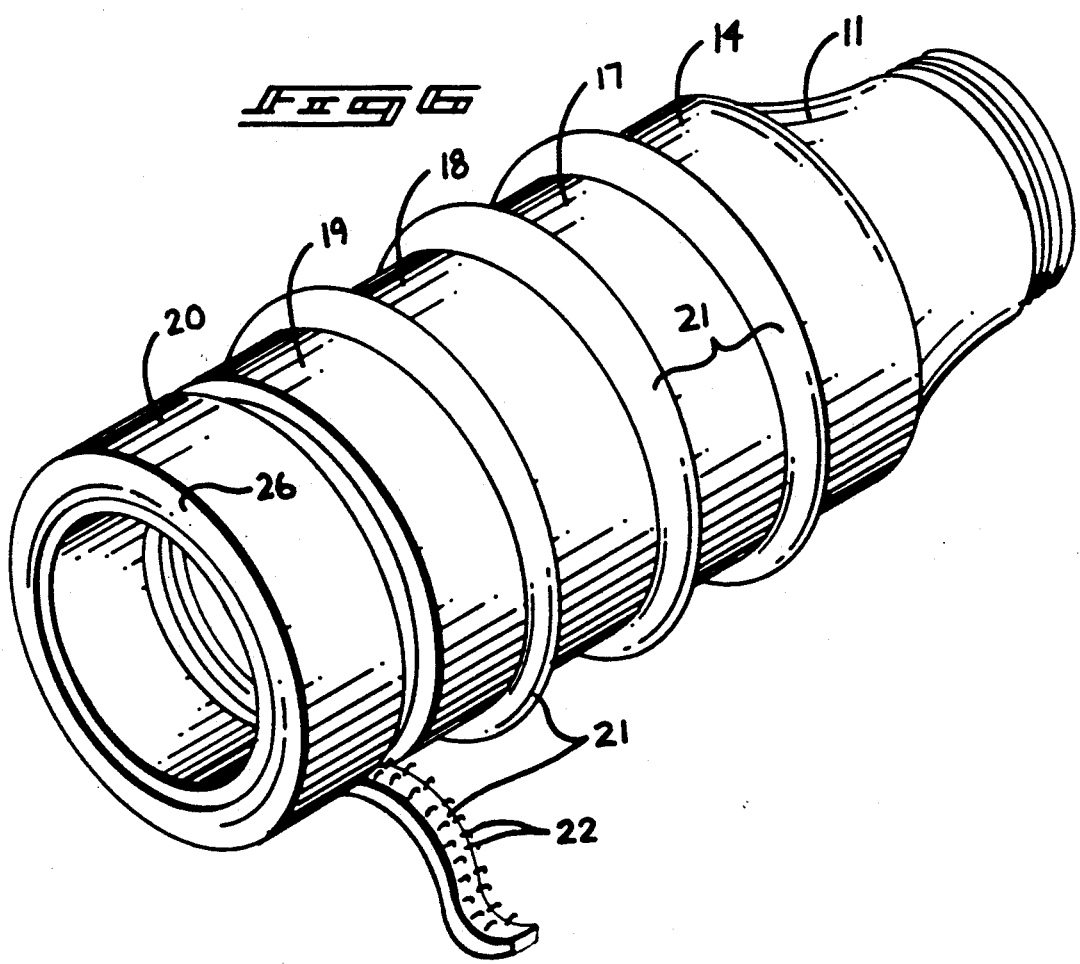

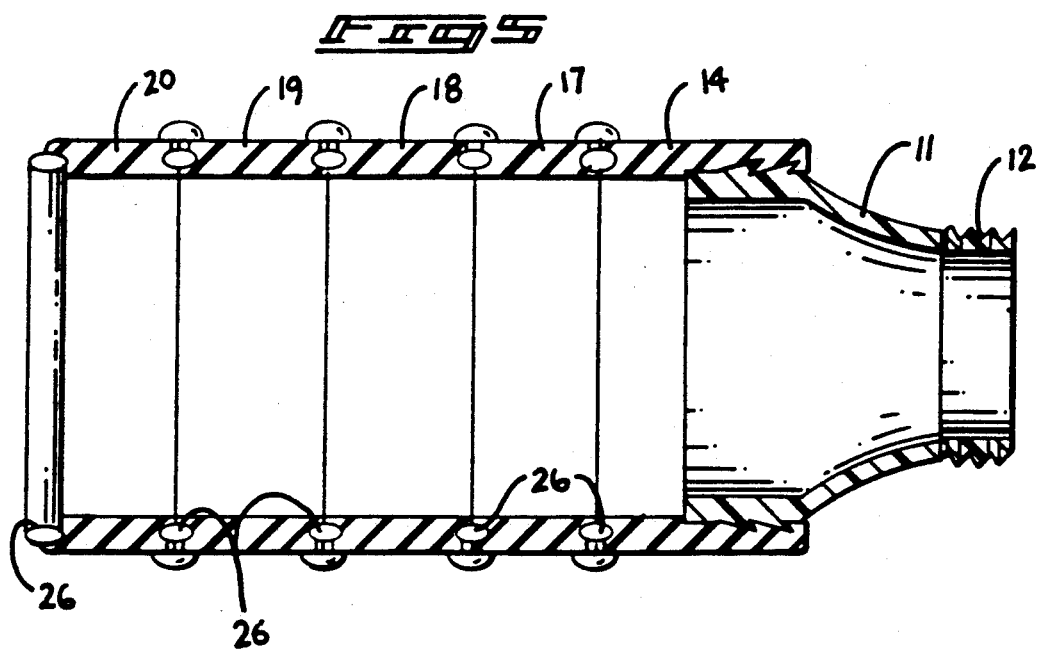
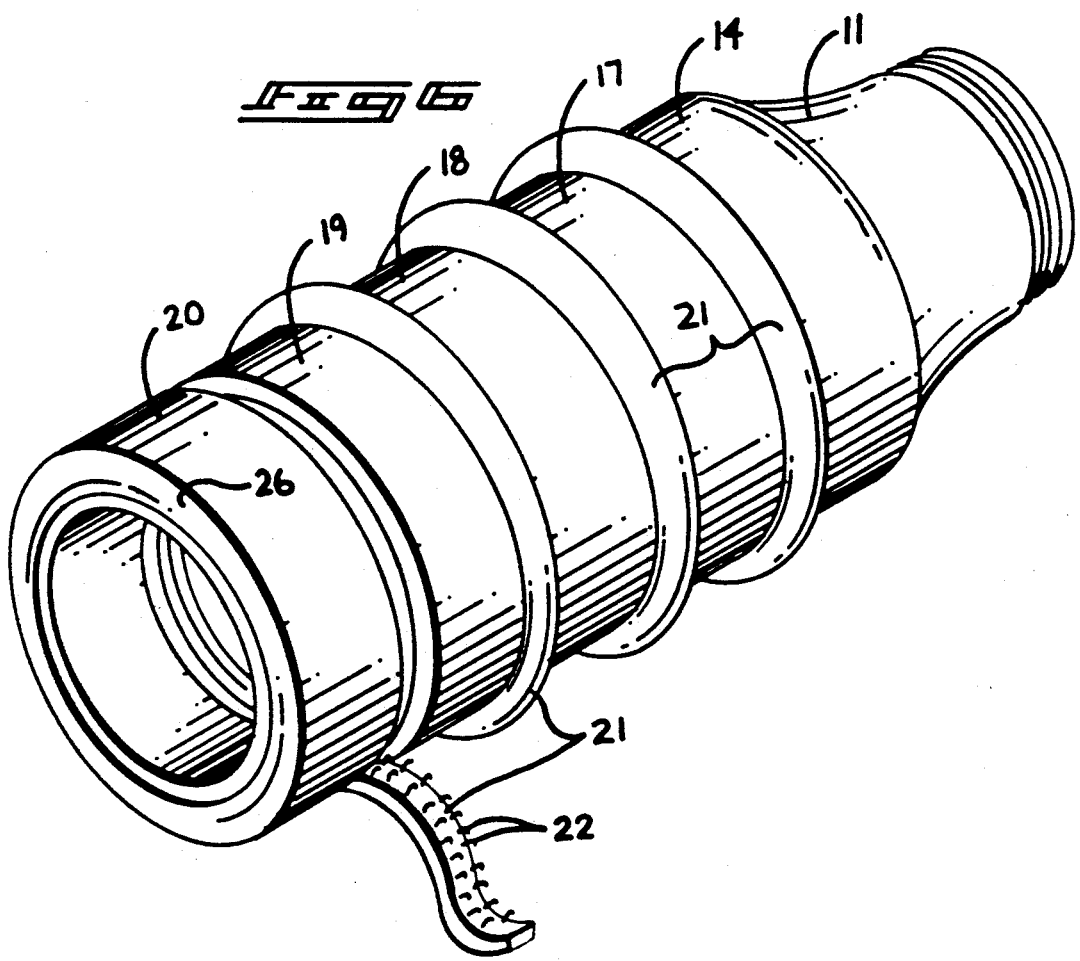

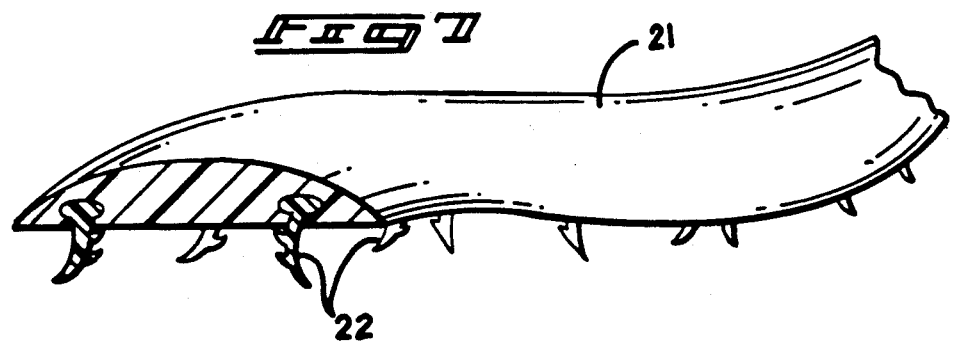
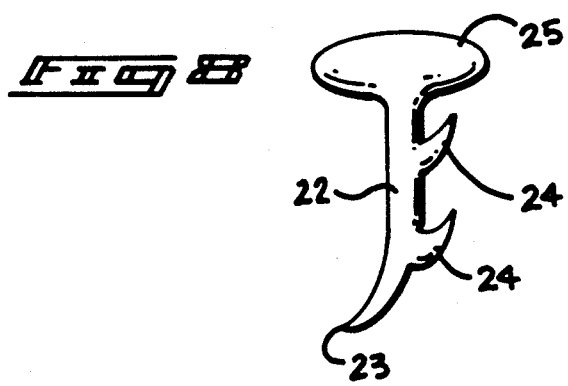
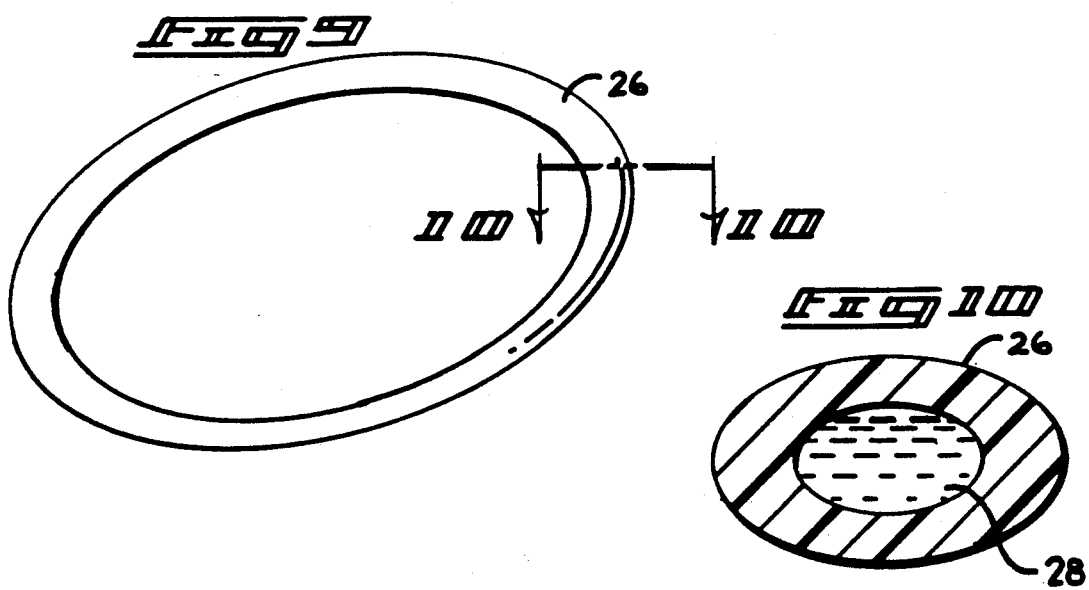

CAMERA LENS HOOD

BACKGROUND OF THE INVENTION

1. Field of the Invention

The field of invention relates to camera equipment, and more particularly pertains to a new and improved camera lens hood wherein the same is arranged for mounting a camera in contiguous communication with a transparent window pane utilizing a flash to minimize glare in use of the camera.

2. Description of the Prior Art

Various hooded apparatus is utilized with cameras to prevent glare from entering the camera lens during a photographing procedure. Such apparatus is found for example in U.S. Pat. No. 4,295,706 to Frost wherein a sunshade is of a generally rigid construction as opposed to the instant invention.

U.S. Pat. No. 4,002,402 to Mito sets forth a lens hood organization for use with a zoom lens and capable of moving coaxially along the optical axis relative to the fixed lens barrel.

U.S. Pat. No. 4,563,603 to Coquin sets forth a sunshade organization utilizing a latching arrangement for securement of a lens hood to a connecting ring.

U.S. Pat. No. 4,909,617 to Boyd sets forth a camera hood with a pivoting lens cap to effect selective covering of the lens hood in use.

As such, it may be appreciated that there continues to be a need for a new and improved camera lens hood as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of camera equipment now present in the prior art, the present invention provides a camera lens hood wherein the same utilizes a polymeric foam cylindrical barrel mounted coaxially to a mounting ring to permit sealed engagement to an associated window. As such, the general purpose of the present invention, which will be described subsequently in greater detail, is to provide a new and improved camera lens hood which has all the advantages of the prior art camera equipment and none of the disadvantages.

To attain this, the present invention provides a lens hood mounted in association with a lens of a camera for positioning the hood and its forward planar surface in contiguous communication with a transparent window pane and the like to permit photographing utilizing a flash through the window pane without glare. The organization includes a foam polymeric cylinder mounted to a rigid mounting ring that in turn is secured to the camera lens in a coaxially aligned relationship. A modification of the invention includes a plurality of separately removable sections, with each section including a mounting face and a gel filled sealing ring mounted within the forward face for enhanced securement engagement with the window pane.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved camera lens hood which has all the advantages of the prior art camera equipment and none of the disadvantages.

It is another object of the present invention to provide a new and improved camera lens hood which may be easily and efficiently manufactured and marketed.

It is a further object of the present invention to provide a new and improved camera lens hood which is of a durable and reliable construction.

An even further object of the present invention is to provide a new and improved camera lens hood which is susceptible of a low cost of manufacture with regard to both materials and labor, and which accordingly is then susceptible of low prices of sale to the consuming public, thereby making such camera lens hoods economically available to the buying public.

Still yet another object of the present invention is to provide a new and improved camera lens hood which provides in the apparatuses and methods of the prior art some of the advantages thereof, while simultaneously overcoming some of the disadvantages normally associated therewith.

Still another object of the present invention is to provide a new and improved camera lens hood wherein the same is arranged for sealingly mounting a cylindrical barrel of the camera lens to an associated window pane to prevent glare entering the lens hood during use of a photoflash equipment member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art camera and lens organization.

FIG. 2 is an isometric illustration of the instant invention.

FIG. 5 is an orthographic cross-sectional illustration of the invention as set forth in FIG. 4.

FIG. 6 is an isometric illustration of the modification of the invention removing a forward section thereof.

FIG. 7 is an orthographic side view, partially in section, of the securement tape member utilized by the instant invention.

FIG. 8 is an orthographic side view of a spike member utilized with the tape structure, as set forth in FIG. 7.

FIG. 9 is an isometric illustration of a sealing ring utilized by the instant invention.

FIG. 10 is an orthographic view, taken along the lines 10—10 of FIG. 9 in the direction indicated by the arrows.

DESCRIPTION OF THE PREFERRED EMBODIMENT

Figure 3:
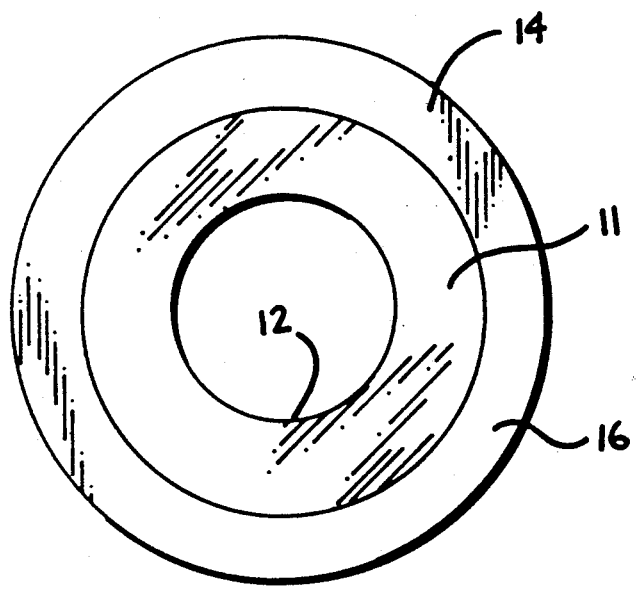
FIG. 3 is an orthographic front end view of the instant invention.

With reference now to the drawings, and in particular to FIGS. 1 to 10 thereof, a new and improved camera lens hood embodying the principles and concepts of the present invention and generally designated by the reference numeral 10 will be described.

FIG. 1 illustrates a prior art camera and lens organization 1, wherein the lens hood 2 is formed of a generally rigid construction and as set forth in U.S. Pat. No. 4,295,706 to provide a respective cap and sunshade structure in use of the camera lens barrel of the camera.

More specifically, the camera lens hood 10 of the instant invention essentially comprises a rigid mounting ring 11 arranged for threaded engagement with an interior surface of an associated camera lens barrel, wherein the rigid mounting ring 11 is defined by a concave exterior surface, with an externally threaded securement cylinder 12 integrally formed to the ring 11 at a rear terminal end portion thereof defined by a first diameter. Annular forward end mounting 13 defined by a second diameter greater than the first diameter coaxially secures a polymeric foam shade cylinder 14 thereto in coaxial alignment with the mounting ring 11 and defined by a central axis 11a. The shade cylinder 14 is defined by a third diameter greater than the second diameter of the annular forward end mounting surface 13 that in turn is greater than the first diameter of the externally threaded securement cylinder 12. A planar rear surface 15 spaces the annular exterior surface of the shade cylinder 14 from the axis 11a. A torroidal planar positioning surface 16 that is defined along a plane orthogonally oriented relative to the axis 11a is arranged for mounting in contiguous communication with a window pane and the like when an associated camera is utilized in cooperation with a flash attachment to prevent glare from use of the flash from entering the camera lens barrel when photographing through a transparent window pane and the like.

Figure 4:
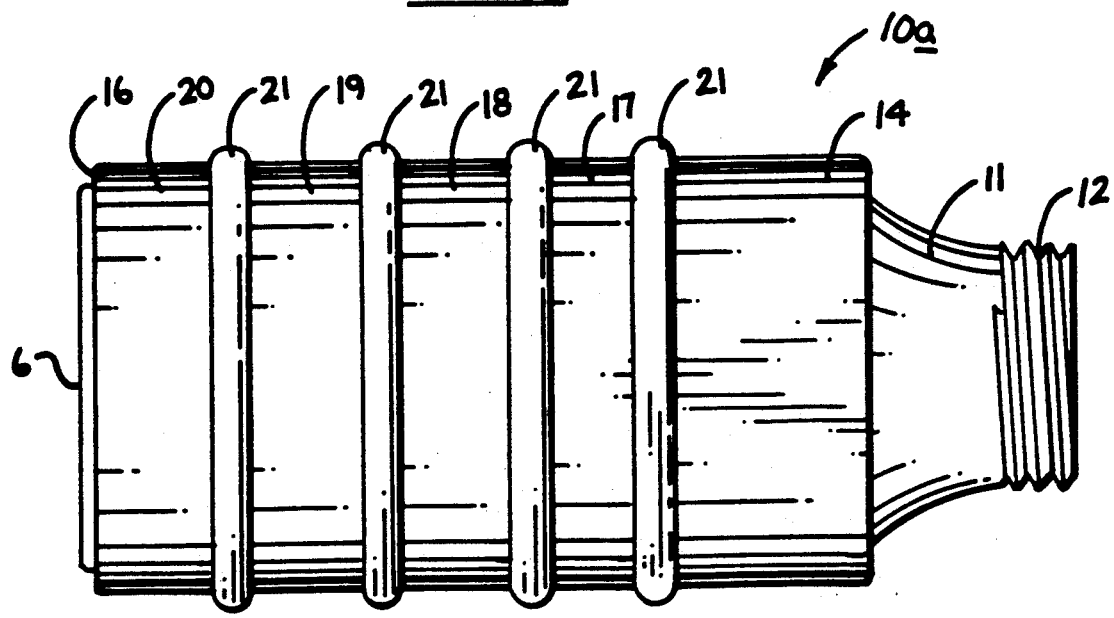
FIG. 4 is an orthographic side view of a modification of the instant invention.

FIG. 4 illustrates the use of a modified camera lens 10a, wherein the foam cylinder 14 and the torroidal planar positioning surface 16 of the shade cylinder 14 coaxially mounts in alignment respective second, third, fourth, and fifth polymeric foam shade cylinders 17, 18, 19, and 20 respectively coaxially aligned relative to one another mounting each respective shade cylinder to each respective positioning surface 16 of each shade cylinder. A flexible removable adhering tape member 21 is provided in surrounding relationship relative to each intersection of each shade cylinder. Each tape member 21 includes a matrix of rigid engagement spikes 22 extending exteriorly of the bottom surface of each tape member 21. Each spike 22 includes a central shank with a pointed forward end 23 and a mounting head 25 that is imbedded in the tape member 21. Rearwardly extending pointed spurs 24 extend rearwardly towards the bottom surface of the tape member 21 integrally mounted to the central shank of each spike to removably engage the tape member 21 from each respective shade cylinder. Further, each torroidal planar positioning surface 16 includes a gel filled sealing ring 26, and includes a viscose gel 28 extending coextensively therethrough to provide enhanced sealing engagement with the associated window pane, as noted above, wherein each gel filled sealing ring 26 may be desirably punctured to release the gel therefrom for coating the torroidal planar positioning surface 16 for enhanced sealing to the associated window. Accordingly, subsequent shade cylinders may be utilized as the respective gel filled sealing rings 26 are utilized.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A camera lens hood for use in combination with a camera, wherein the camera includes an internally threaded camera barrel, the lens hood comprises, a rigid mounting ring, the rigid mounting ring including a rear terminal end portion, with the rear terminal end portion including externally threaded securement cylinder threaddedly securable within the camera barrel, and the mounting ring includes an annular forward end, the externally threaded securement cylinder defined by a first diameter and the annular forward end is defined by a second diameter, wherein the second diameter is greater than the first diameter, and a polymeric foam shade cylinder mounted to the annular forward end, wherein the shade cylinder is defined by a third diameter greater than the second diameter, and the rigid mounting ring is defined along a predetermined axis, and wherein the shade cylinder is coaxially aligned relative to the mounting ring along the predetermined axis.

2. An apparatus as set forth in claim 1 wherein the shade cylinder includes a torroidal planar positioning surface formed at a forward terminal end of the shade cylinder, wherein the positioning surface is orthogonally oriented relative to the predetermined axis.

3. An apparatus as set forth in claim 2 including a second shade cylinder coaxially aligned with and mounted to the shade cylinder, and a third shade cylinder coaxially aligned with and mounted to the second shade cylinder, wherein each shade cylinder includes a flexible removable adhering tape member joining each shade cylinder relative to an adjacent shade cylinder.

4. An apparatus as set forth in claim 3 wherein each shade cylinder mounted to the adjacent shade cylinder defines a junction, and the tape member is mounted overlying the junction, and the tape member includes a tape member bottom surface and the tape member bottom surface includes a matrix of rigid engagement spikes extending downwardly from the bottom surface removably mounted within each adjacent shade cylinder about the junction.

5. An apparatus as set forth in claim 4 wherein each of the engagement spikes includes a mounting head imbedded within the adhering tape, and further includes a rigid central shank terminating in a forward pointed end, and at least one rearwardly extending pointed spur fixedly mounted to the central shank extending towards the bottom surface of the tape member for enhanced engagement of each spike within a respective shade cylinder.

6. An apparatus as set forth in claim 5 wherein each shade cylinder includes the planar positioning surface formed at a forward terminal end of each shade cylinder, and each positioning surface includes a gel filled sealing ring mounted coextensively within each positioning surface extending exteriorly of the positioning surface, including a viscose gel therewithin, wherein the sealing ring is selectively punctured to direct the viscose gel by each positioning surface for enhanced sealing of each positioning surface with an engagement surface such as a window pane.

* * * * *